United States Patent [19]

Masero

[11] 4,427,495
[45] Jan. 24, 1984

[54] APPARATUS AND METHOD FOR UPGRADING LOW PRESSURE STEAM BRINES AND THE LIKE

[76] Inventor: Kenneth J. Masero, 600 Arboleda Dr., Los Altos, Calif. 94022

[21] Appl. No.: 394,561

[22] Filed: Jul. 2, 1982

Related U.S. Application Data

[63] Continuation-in-part of Ser. No. 171,212, Jul. 21, 1980, abandoned, which is a continuation of Ser. No. 955,064, Oct. 26, 1978, abandoned.

[51] Int. Cl.$^3$ .............................. C02F 1/10; C02F 1/20
[52] U.S. Cl. ....................................... 203/11; 203/39; 203/92; 203/100; 203/DIG. 14; 60/641.2; 159/16 S; 159/DIG. 31; 202/176; 202/177; 202/197; 202/234
[58] Field of Search .............. 159/16 S, 2, 47 R, 47.1, 159/DIG. 31; 203/11, 10, 92, 95, DIG. 20, 203/DIG. 14, 100, 7, 39, 40; 202/176, 234, 177, 197; 60/641 D, 648

[56] References Cited

U.S. PATENT DOCUMENTS

| | | | |
|---|---|---|---|
| 1,951,752 | 3/1934 | Roller | 159/16 S |
| 3,026,261 | 3/1962 | Mayfield et al. | 159/47 R |
| 3,152,053 | 10/1964 | Lynam | 203/11 |
| 3,607,663 | 9/1971 | Vandenberg | 203/11 |
| 4,054,493 | 10/1977 | Roller | 159/16 S |
| 4,247,371 | 1/1981 | Roller | 203/100 |
| 4,272,960 | 6/1981 | Wahl | 203/DIG. 20 |
| 4,282,070 | 8/1981 | Egosi | 203/11 |

Primary Examiner—Wilbur L. Bascomb, Jr.
Attorney, Agent, or Firm—John L. McGannon

[57] ABSTRACT

Apparatus and a method for upgrading low pressure steam or brine, such as from a geothermal well, to prepare the steam or brine for any one of a number of uses, such as for conversion to pure, high pressure, high temperature steam for driving turbines. The system operates in a degasification phase in which a small amount of superheated steam is applied to the brine to scrub the same to cause the removal of concentrated gases therefrom. The degasified product is then pumped to a high pressure, heated countercurrently, and directed through a demineralized phase to remove the salts and solids in a liquid phase and convert the bulk of the water into pure, high pressure saturated steam. The steam output from the demineralizing phase can then be used to produce useful work, such as driving a turbine. In addition to forming saturated steam from geothermal brine, the system can be used to form pure saturated steam from impure water from any suitable source. The system can be used to produce clear, potable hot water from sea water and other water having contaminants therein. For dry steam from geothermal wells, the gas-contaminated steam is converted to brine without loss of temperature or pressure by adding pure hot water so that the resulting mixture can be degasified in the liquid phase. Valuable salts can be recovered and gases of commercial value can be isolated by the present method.

6 Claims, 5 Drawing Figures

APPARATUS AND METHOD FOR UPGRADING LOW PRESSURE STEAM BRINES AND THE LIKE

This is a continuation-in-part application of application Ser. No. 171,212, filed July 21, 1980, now abandoned the latter application having been a continuation application of application Ser. No. 955,064, filed Oct. 26, 1978, now abandoned.

BACKGROUND OF THE INVENTION

Most geothermal wells produce heat energy in hot water at temperatures at 300° to 480° F., which are much lower temperatures than used in modern efficient steam electric plants. The overall efficiencies of wet geothermal steam plants are in the range of 10 to 14 percent as compared to fossil or nuclear plants which are in excess of 40 percent.

In the present state of the art, wet steam processes function inefficiently at these low temperatures by flashing through pressure drop 10 to 15 percent of their brine to an impure saturated steam or by using an independent secondary low boiling working fluid for power generation. Large quantitites of residual brine must be circulated and disposed of by ecologically acceptable means. Often the steam-spent brines are repressurized and pumped back into the earth, there being no other practical way of disposal. When steam is released by flashing geothermal brine, the steam produced is in a low temperature range where ordinary steam turbines do not operate efficiently.

Most of the geothermal brines and low pressure steam contain toxic and corrosive non-condensible gases, such as hydrogen sulfide, ammonia, sulfur dioxide, carbon dioxide, methane and ethane, which ultimately escape to the immediate atmosphere and constitute a difficult collecting problem and health hazard. The problem is intensified with the addition of each new well added, ultimately restricting the number of wells in a given geothermal field.

Prior disclosures relating to the conversion of saline water to fresh water include U.S. Pat. Nos. 3,951,752 and 4,054,493. These patents disclose the prior removal of chemical precipitation means those chemical ions present that will form scale on heat transfer surfaces during the flash evaporation stages required to separate salts from saline water and thus produce pure water. To accomplish this a number of chemicals, such as, sulfuric acid, lime, sodium sulfite, carbon dioxide, magnesium hydroxide, ahydride, etc., are metered into the saline water in controlled amounts along with steam at various degrees of temperature to produce the proper insoluble precipitates that are removed in the thermo precipitation tank. This tank is a low pressure tank where the insoluble precipitates are removed by settling and gravity from the water. At least 60 percent of the equipment disclosed in each of these patents is required to accomplish this one objective.

In these two patents, the techniques described must be under chemical laboratory control and analysis at all times to provide the proper amounts and types of chemicals. Also, to remove the soluble gases present in the saline water, a vessel called a deaerator is required. In normal practice this involves the use of steam, vacuum and special chemicals to accomplish degasification.

SUMMARY OF THE INVENTION

The present invention is directed to apparatus and a method for upgrading brines, such as the brine of wet steam wells, by pumping the brine to a higher pressure and flashing off the impurity gases to containment. The degasified brine is pumped to a high pressure while being heated counter-currently to higher temperatures. Finally, the upgraded brines are contacted in direct heat transfer with superheated steam from a boiler or other superheater against a back pressure to produce large volumes of high pressure saturated steam. In addition, a small fraction of condensate is formed, which is centrifugally removed from the steam carrying the salts and suspended solids with it in concentrated form.

The highly concentrated salt solution can further be reduced to solids by flashing or spray drying for simple disposal or for retrieval and later use. The present invention can be used for generating power efficiently using brine having wide variations in salt content, temperature and pressure.

The source of the required high pressure superheated steam is an independent efficient boiler that generates about 10 to 20 percent of the total steam output of the plant. The bulk of the independent boiler steam output reports to the turbines for power generation at high pressure and temperature after passing through the demineralizer and rendering its superheat to the brine to produce a 4 or 5 fold increase in saturated steam.

The degasification process is effected in small self-cleaning continuous equipment prior to the demineralization and saturated steam production phase. This is accomplished either by the addition of a small amount of superheated steam or by a sudden pressure drop of the brine at its saturation temperature (boiling point at a given pressure). A combination of the two methods can also be used.

Instead of using brine from a geothermal well, water from any suitable source can be used to produce quality steam at the high temperatures and pressures required for efficient power production. Also, the system of the present invention can be used for the sole production of pure hot water from practically any source, such as sea water, brackish well water and industrial waste solutions.

In contrast to the above-mentioned U.S. Pat. Nos. 3,951,752 and 4,054,493, the present invention provides apparatus and a method in which no precipitating chemicals are required, since there is no need for indirect heat transfer surfaces for evaporation. The only evaporation in the present invention is in a demineralizer in a single stage where the saline water and superheated steam are sprayed together directly in a two-fluid nozzle eliminating the need for heat transfer surfaces. Also, the present invention is completely independent of the nature, composition and quantity of the salts and gases present.

In the present invention, the degasification step requires only a slight pressure drop and a small quantity of superheated steam in a continuous flow step on the way to the demineralization step. No chemicals are required. From the deaeration (degasification step) the gases present as commercial by-products are recovered without the use of costly chemicals and chemical flow controls. In the case of geothermal waters, this becomes important as methane, carbon dioxide and sulfur dioxide can be recovered as valuable commercial by-products.

In only one simple stage in the demineralizer of the present invention, pure water in the form of high pressure steam is removed with a conversion of 95–98 percent yield. This is to be compared with the four stages of large low-pressure multiple flash evaporators that are required to obtain solely pure water ranging in recovery from 70–90 percent.

Since the invention produces steam at high pressure and temperature, electric power can be readily produced through a bank of efficient turbines, steam can be condensed to pure water, or a combination of power and pure water can be easily pressure. The structures of the above two patents cannot produce power and pure water, since their operating pressures and temperatures are too low.

In order for the present invention to function very efficiently and only require one pound of generated high-pressure superheated steam from an auxiliary boiler to process seven pounds of geothermal brine or saline water, the inventory operates at much higher pressures and temperatures than those required of U.S. Pat. Nos. 3,951,752 and 4,054,493. If the standard steam tables found in many handbooks for saturated steam are examined, it is found that, at a temperature range of 260°–300° F. (the temperature span of these two patents), the corresponding boiler pressure ranges from 30–70 psi. At this pressure it takes 945–908 BTUs to evaporate one pound of water from a liquid to a gas without any change in temperature. At the high pressures (3,200 psi) and temperatures of the present invention, the latent heat required to change one pound of water to one pound of steam becomes zero BTU. This allows the present invention to have improved thermal efficiency greatly by operating in the higher pressure and corresponding higher temperature range. In effect, the present invention saves considerable fuel for only a small amount of energy required to pump water to the higher pressures.

There is another great advantage in operating the present invention in the high pressure and high temperature ranges; namely, the equipment of the present invention is smaller in size to handle large volumes of water and steam. From the steam tables, the specific volume figures listed for a given temperature and pressure set forth the cubic feet occupied by one pound of steam. For example, at 260° F. one pound of steam occupies about 12 cubic feet of space, while at 3,206 psi and the corresponding saturation temperature of 706° F. one pound of steam occupies 0.0503 cubic feet. This explains why the equipment of the present invention can be kept very small and inexpensive compared to the sizes of evaporators required to process one ton of brine per hour at 260° F. It would take 24,000 cubic feet of conventional equipment space to process one ton of brine. Thus, the equipment of the present invention is small in size, operates at high velocities and is thermally very efficient compared to the complexity of the equipment and processing required of U.S. Pat. Nos. 3,951,752 and 4,054,413.

The primary object of this invention is to provide apparatus and method for upgrading water masses and steam which are of relatively low pressure and temperature and which contain contaminants so that the resulting product will be a pure high temperature and high pressure steam product capable of producing efficiently useful work or otherwise being used in a manner not capable in the original state of the product.

Another object of this invention is to provide an apparatus and method of the type described wherein geothermal brines or geothermal steam can be purified and increased in pressure and temperature so that the resulting steam product can be used efficiently for effective power production, such as by directing the product through turbine and the like.

Still another object of this invention is to provide apparatus and method wherein pure hot water can be produced by the operation of the system when water having contaminants, such as sea water, is supplied to the input of the system.

A further object of this invention is to provide apparatus and a method of the type described wherein valuable byproducts can be recovered as water masses and steam are upgraded, all of which are accomplished without affecting ecological values.

Other objects of this invention will become apparent as the following specification progresses, reference being had to the accompanying drawing for an illustration of various parts of the present invention.

IN THE DRAWINGS

Figure 1:
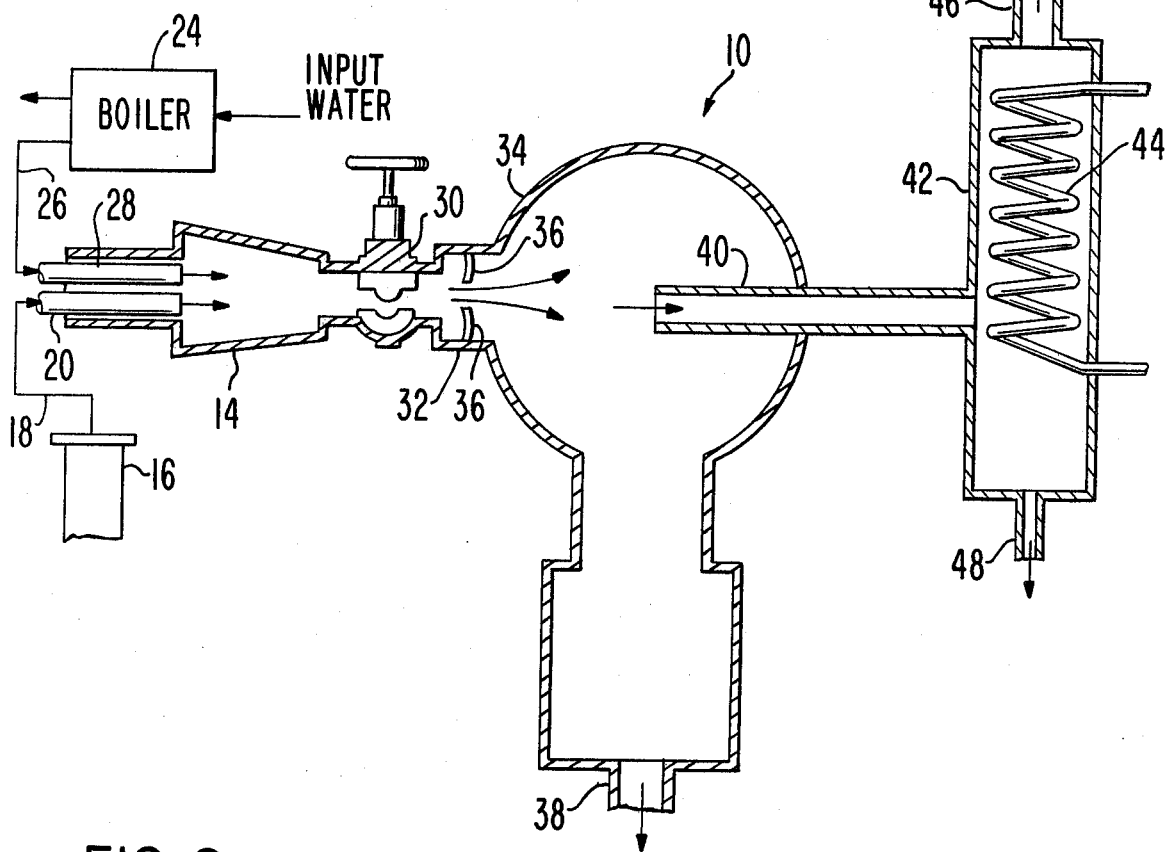
FIG. 1 is a vertical cross section through a deaeration unit forming a part of the present invention.
Figure 2:
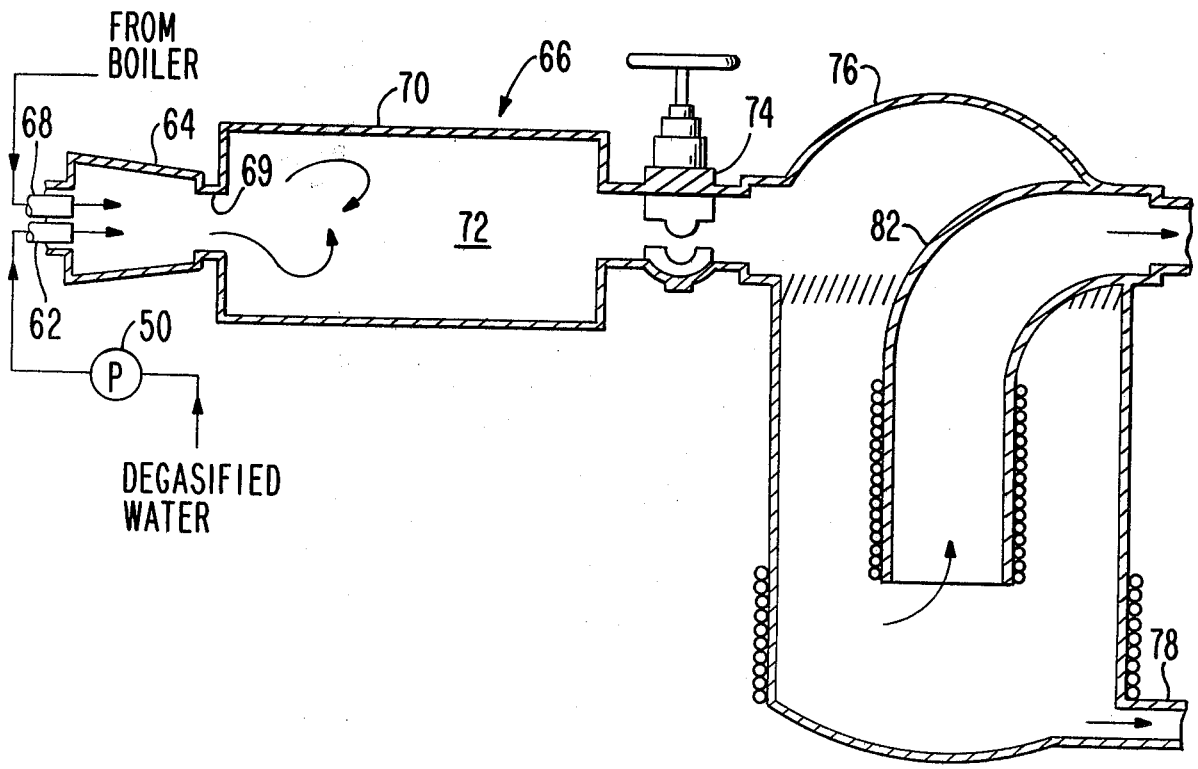
FIG. 2 is a vertical section through a demineralization unit forming another part of the present invention.
Figure 4:
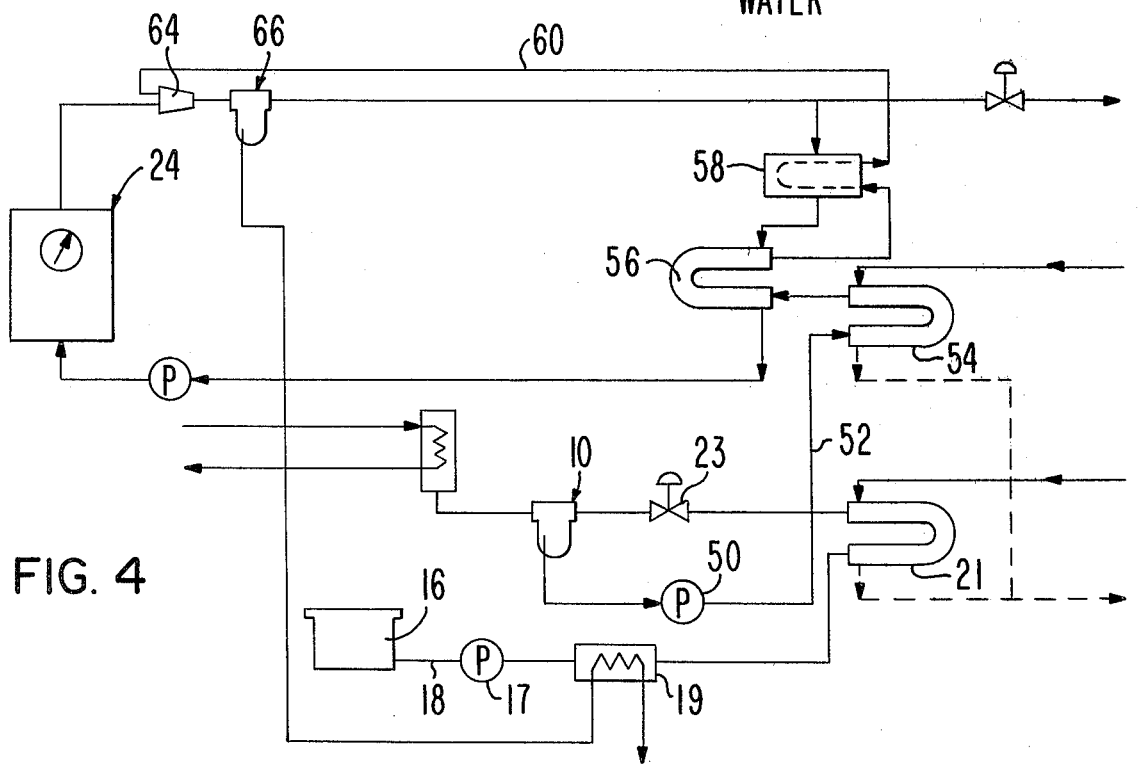
FIG. 4 is a schematic view of the system of the present invention when used when the input is water and when the system is used for producing steam.

The first embodiment of the present invention will be described with reference to the upgrading of brine from a geothermal well and the system is shown in FIGS. 1, 2 and 4 for handing such brine. In FIG. 1, a degasifier 10 includes an injection nozzle 14. Brine from a geothermal well 16 is directed by a pump 17 (FIG. 4) along line 18 through heat exchangers 19 and 21 (FIG. 4) to an inlet pipe 20 (FIG. 1) whose inner end communicates with nozzle 14. A regulator 23 (FIG. 4) provides a back pressure for the system by maintaining a constant pressure drop. A small amount of superheated steam from a boiler 24 is directed from the boiler along a line 26 to an inlet pipe 28 also in fluid communication with nozzle 14.

The raw geothermal brine and the small quantity of superheated steam, after being directed into and mixed in the two-fluid nozzle 14, are directed past a valve 30 and through the inlet 32 of a cyclone separator 34 having spaced vanes 36 at the inlet 32, the vanes defining an inlet opening for receiving the mixture of the brine and the superheated steam. The cyclone separator causes the water content of the brine to move to the outer wall of the separator when it gravitates to the bottom and is removed from water outlet 38 thereof. The concentrated gases separated from the water content leave the separator through an exit pipe 40 and enter a condenser 42 having a cooling coil 44 therein, the coil being coupled to a source of coolant exteriorly of condensor 42. Confined noncondensible gases leave condenser 42 by way of a stack 46 for upgrading or disposal as the condensible gases leave by way of an outlet tube 48.

Superheated steam with its low partial pressure of carbon dioxide, hydrogen sulfide, ammonia and the like will readily scrub the brine feed water in the gasifier 10 when intimate contact is established between the feed water and superheated steam. This is an application of Henry's Law which, when applied in the present case, states that the amount of gas held in solution is proportional to the partial pressure of the gas in the atmosphere in contact with the geothermal brine. Only small amounts of superheated steam are required since it is used as a scrubbing gas in intimate contact with the raw brine.

In the case of superheated steam wells, hot water under pressure previously derived from the process is added to the superheated steam in sufficient quantity to desuperheat the steam to form a liquid brine similar to the wet steam well brine to proceed with the deaeration cycle described above. One or more degasification steps may be required for a given brine. Using the degasifier of FIG. 1, brine initially containing 0.7 percent noncondensible gases by weight was degasified to a brine containing 0.005 cc/liter of residual gas.

The degasified brine leaving degasifier 10 is next directed by a pump 50 (FIG. 4) along a line 52 through several heat exchangers 54, 56 and 58 and then along a line 60 to an inlet pipe 62 (FIG. 2) forming a part of a two-fluid nozzle 64 of a demineralizing unit 66. The nozzle also has a second inlet pipe 68 coupled to boiler 24 for receiving superheated steam therefrom. The degasified brine from degasifier 10 is heated in stages countercurrently with auxiliary steam or other heated fluid so that the degasified brine is preheated by the time it reaches nozzle 64 (FIG. 2).

Nozzle 64 has an outlet which is coupled to the inlet opening 69 of a vessel 70 forming a mixing chamber 72 where the superheated steam and degasified brine are readily mixed together before the mixture passes through a valve 74 and into a separator 76 forming a part of demineralizing unit 66. The term, demineralization, refers to the removal of the bulk of water as steam from the dissolved and suspended salts. The demineralizing unit thereby uses nozzle 64, mixer vessel 70 and separator 76, the latter element being operable to remove the moisture and salts from the steam. The separator can be a conventional cyclone-type separator with no moving parts.

Figure 3:
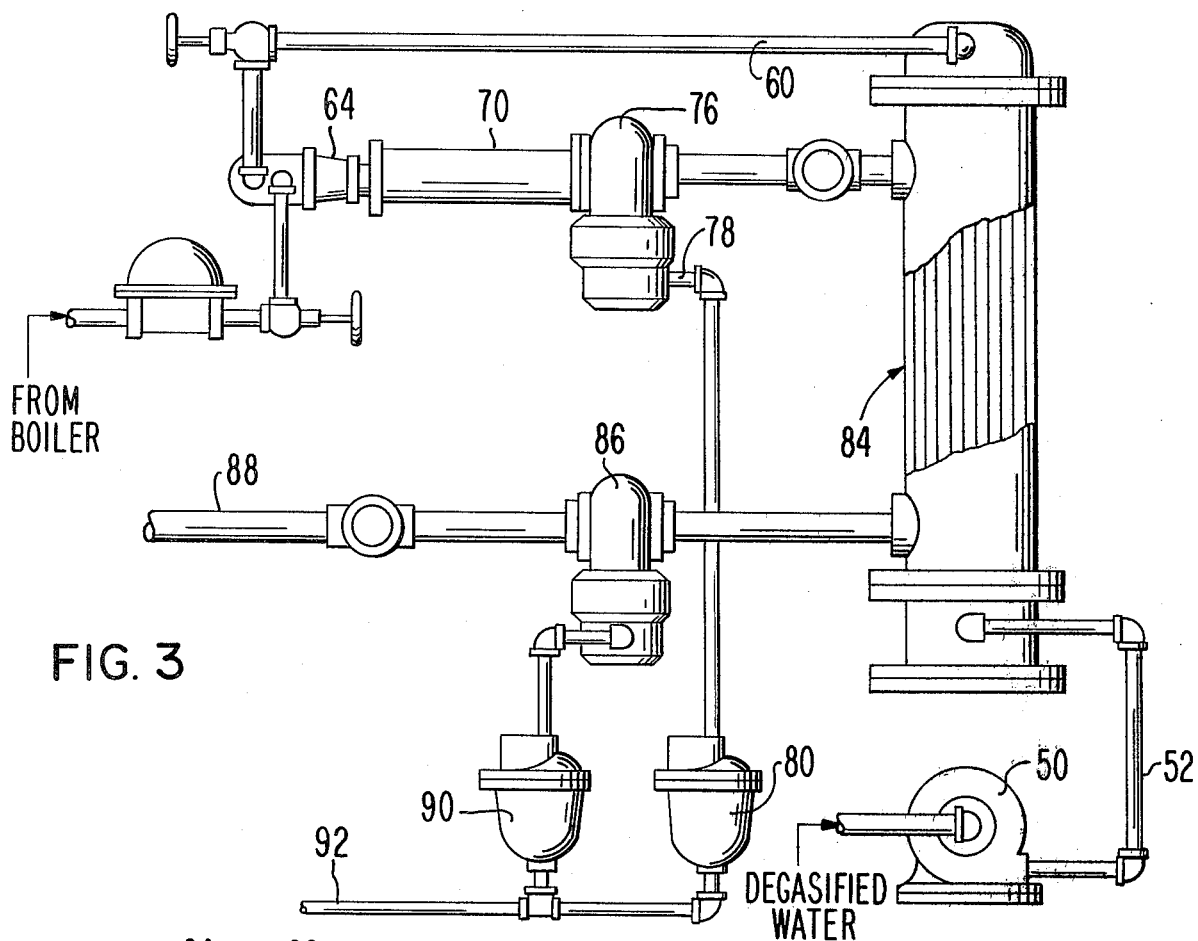
FIG. 3 is a side elevational view of a two-stage demineralization unit that can be used with the present invention.

In separator 76, the moisture and salts are centrifugally cast from the wet steam and allowed to drain continuously to the outlet 78 of the separator for drainage continuously to a waste disposal station by way of a steam trap 80 (FIG. 3). Dry saturated steam flows upwardly into a tube 82 in separator 76 and outwardly of the separator and such dry steam can be used directly for process work or sent to a series of turbines for power generation. The dry steam, if necessary, can be directed also through a super-heater and then to the turbines. In this manner, a continuous flow of pure steam and concentrated salt solution leave separator 76, thereby rendering the system self-cleaning.

FIG. 3 shows us a two-stage demineralization unit wherein the output from the first stage separator 76 directed through a heat exchanger 84 to a second stage separator 86 and then to an outlet line 88 for direct use or for transfer of the dry steam to turbines. A second trap 90 is associated with separator 76 and both traps 80 and 90 are coupled by a line 92 to a point of disposal. Heat exchanger 84 may also incorporate the heat exchangers 54, 56 and 58 (FIG. 4) which are downstream of pump 50.

In demineralizing unit 66, when superheated steam and raw brine are allowed to become intimately mixed in the proper proportions, the heat of the superheated steam is transferred to the brine by direct heat transfer, producing a rapid evaporation of the raw brine. Raw brine then becomes saturated steam. The net result is to produce more steam than entered the system by the amount of the brine which was allowed to evaporate. In normal practice, all of the brine except about one percent or less is vaporized. This slight excess moisture carried into the separator 76 as a fog agglomerates the salts and suspended particles which are centrifugally cast from the steam and allowed to drain through outlet 78, trap 80 and thereby to line 92 for disposal.

Favorable conditions of operation of the system of this invention require a low value for the ratio of weight of superheated steam to the weight of raw brine. This ratio will depend upon the following factors: the temperature and amount of superheated steam entering the system, the temperature and amount of brine entering the system, the amount of salts in the raw brine, and the back pressure in the system. It is obvious that, the higher the temperature of the superheated steam, the greater amount by weight of raw brine that can be evaporated. For conditions where the above ratio is high, such as approximately 4, then 5 parts by weight of saturated steam will be created with very little loss of heat. This heat loss is kept to a minimum because the system possesses such features as direct heat transfer, extremely large heat transfer surfaces, high velocities of fluid flow, small size and continuous operation. The principal loss of heat from a properly insulated unit is in the salt solution to the drain, and this is only a small percentage of the total heat considered. A small heat exchanger or flash tank can be used to recover this heat.

The higher the temperature of the brine entering demineralizing unit 66, the greater will be the amount of brine processed, since the superheated steam will not be required to furnish this sensible heat and more heat energy will be available to evaporate additional brine. Exhaust steam or bled steam from the turbine can be used for pre-heating the brine flowing through heat exchanges 21, 54, 56 and 58 (FIG. 4).

Where the salt content of the brine is high, for example, equivalent to that of sea water (about 36,000 parts per million by weight), a little more water is allowed to enter separator 76 as a fog (unevaporated) to insure enough drain water to carry the concentrated salts through outlets 78 to trap 80. In an actual test, three percent by weight by the brine entering demineralizing unit 66 was required to remove 40,000 parts per million of salts. The purified steam leaving the unit contained less than 2 parts per million of salt by weight. Concentrated liquid discharged from demineralizing unit 66 contained 28 percent of dissolved solids.

The temperature and pressure of the final dry saturated steam will depend upon the back pressure provided in the system by regulator 23. Since the value of the latent heat of vaporization (the heat absorbed in changing from water to steam without an increase in temperature) decreases with rise of temperature and pressure, it is desirable to keep the value of the latent heat low to allow more water to be evaporated. This is accomplished by maintaining a reasonable back pressure upon the system and by operating the system at a pressure of at least 70% of the critical pressure which is defined as the pressure at which the latent heat of vaporization of the degasified water is substantially zero.

The temperature of the system is at least 500° F. when the pressure is at least 70% of the critical pressure. More preferably the pressure is at least 90% of the critical pressure and the temperature is at least 550° F.

It is possible and feasible to operate at or very near the critical pressure (3206 psi) with a moderate superheat and to purify five or more pounds of brine for every pound of superheated steam entering the unit when using heat exchangers for pre-heating the brine to near its saturation temperature. The resulting six pounds of dry saturated steam at a pressure a few pounds below the value of the initial superheated steam will be available for power generation or other useful work.

Demineralizing unit 66 can be considered as an auxiliary boiler since it is a steam producer. Its efficiency is greater than the regular type boiler which uses indirect and low rates of heat transfer per square foot of surface and is subject to scale formation, corrosion, priming and foaming. It is possible with the system of the present invention to obtain overall efficiencies greater than the approximately 40 percent now available in modern boiler plants. One or more stages of demineralization may be required. The major part of the load is actually being taken from the regular boiler and put upon demineralizing unit 66, allowing at the same time purified steam to be obtained. This appears all the more attractive when optimum conditions are realized because the output of pure dry steam can be increased a number of times over.

If demineralizing unit 66 is considered from the standpoint of the dissolved salts passing through it, dilute solutions enter the system as raw brine and concentrated solutions of salts leave in the drain. An evaporation has been effected and unit 66 may be described as a multiple effect evaporator in a single piece of equipment, since, through a physical process, solutions are concentrated by removing part of the water by vaporization. There is a demand for evaporators in the process industry which can be supplied more efficiently through the use of the system of the present invention than with any of conventional structures now available.

A typical operation of the system of the present invention can be disclosed by specifying a number of operating characteristics of the system at various locations therein. These characteristics include the pressure in psi absolute, the temperature and degrees Fahrenheit, the enthalpy in btu/lb, and the rate of flow in lb. per hr.

At the outlet of well 16, the characteristics are as follows:
$P=14.7$
$T=212$
$H=180$
$R=1156$ At the inlet side of regulator 23:
$P=118$
$T=340$
$H=311$
$R=1156$ At the inlet of degasifier 10 the characteristics are as follows:
$P=14.7$
$T=212$
$H=311$
$R=1156$ At the outlet of degasifier 10, the characteristics
$P=14.7$
$T=212$
$H=180$
$R=1000$ At the inlet of nozzle 64, the characteristics are as follows:
$P=3200$
$T=580$
$H=588$
$R=1000$ At the outlet of demineralizing unit 66, the characteristics are as follows:
$P=3200$
$T=705$
$H=934$
$R=1674$ While well 16 has been described above as being a geothermal well, it can be a reservoir in which water, such as sea water or the like, is directed for subsequent creation of steam as described above. The water entering the reservoir will be suitably preheated so that the temperature of the water passing out of the reservoir may be in the range of 212° F.

Figure 5:
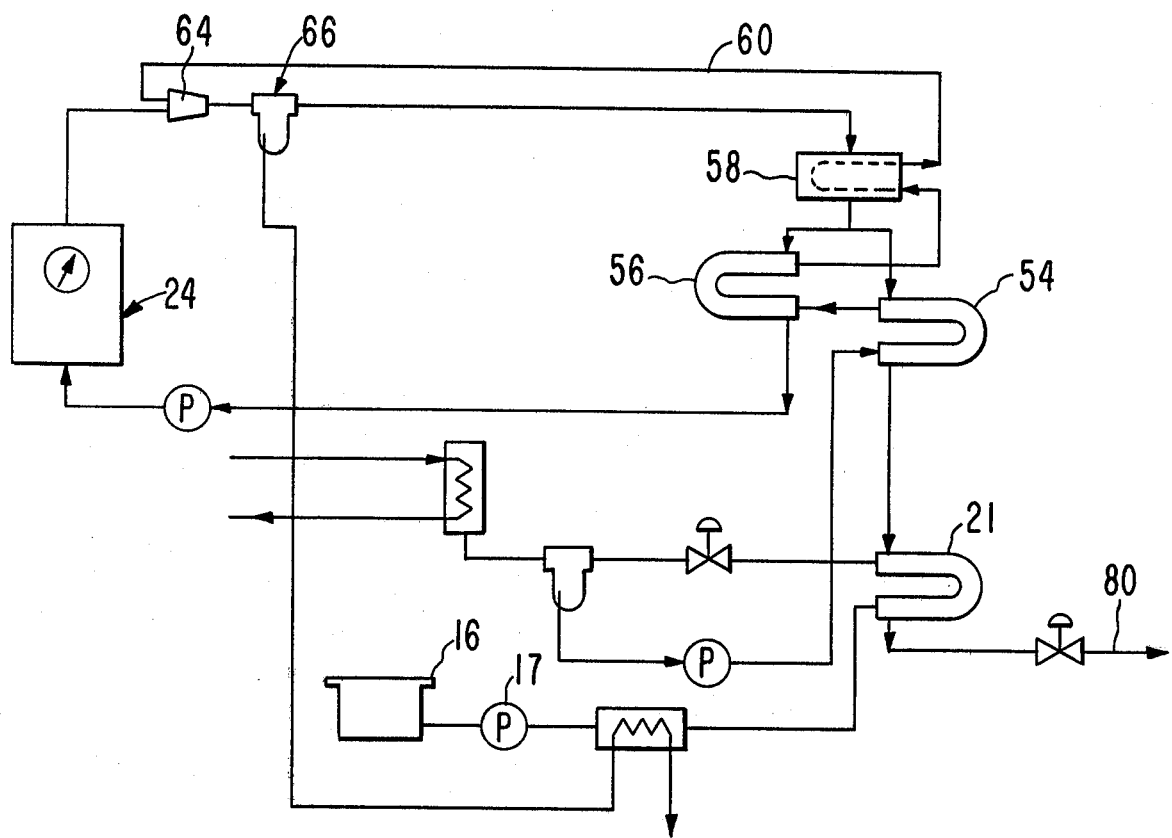
FIG. 5 is a view similar to FIG. 4 but showing the system for the production of pure hot water rather than steam.

FIG. 5 shows the system applied to the sole production of pure hot water from practically any source, such as the sea. The steam of FIG. 5 is substantially the same as that of FIG. 4 except that the output from demineralizing unit 66 is directed through heat exchangers 58, 54 and 21 to an outlet point 80. A part of the output of unit 66 is recirculated through the boiler as shown.

In the system of FIG. 5, boiler 24 is used for supplying the necessary heat for final vaporization of the makeup water at nozzle 64. About 1 percent moisture is to be carried in the steam in unit 66. The moisture and solids are thrown from the steam by centrifugal force in the separator and are drained therefrom.

The pure steam from unit 66 is passed through the various heat exchanges as follows: through heat exchanger 56 to subcool the water to the pump 25 immediately upstream of boiler 24, through heat exchanger 54 to further cool the water, and through heat exchanger 21 for preheating for deaeration.

Deaeration of the makeup water by pressure drop is accomplished with back pressure regulator 23 maintaining a constant pressure drop. Degasifier 10 removes the flashed steam and gases. The steam is condensed in condenser 42 (FIG. 1). Air and gases are vented to the atmosphere and well 16 receives the condensed steam and makeup water. Pump 17 raises the pressure to that required for deaeration. Pump 50 raises the pressure to that required for introducing makeup water into the system. Heat exchanger 19 is provided to cool the blowdown from the separator.

Adaptation of the system of this invention to the use of a specific geothermal brine would result in process simplificatons and great plant economy. Each geothermal brine would require that its optimum cycle be determined. Best operating conditions would require the pressure to be near the critical pressure of 3206 psi. A temperature of 750° F. is recommended although higher values may be more economical for cases where the feed water is not highly preheated.

When considerable quantities of pure water are required, it is possible to use two or more demineralizing units 66 arranged in series. The steam produced in the first unit is heated in a superheater and passed through another unit where a greater quantity of brine is vaporized into steam. This steam can be superheated in a section of the main superheater of the original boiler and the cycle repeated in the next demineralizing unit in series. In this manner, vast quantities of water can be purified with a small pressure drop occurring in each cycle. A suitable cycle could be developed for remote areas that provides sufficient power production along with water purification to take care of its own pumping and utility requirements to become an independent self-sufficient plant.

What is claimed is:

1. A method of converting aerated water containing dissolved salts and suspended solids into pure saturated steam comprising: providing a source of superheated steam; directing a flow of aerated water having dissolved salts and suspended solids therein along a predetermined path; degasifying the water as it flows along said path, said degasifying step including scrubbing the water with a quantity of superheated steam from said source; exerting a back pressure on the water before it is degasified; pressurizing and heating the water after it has been degasified to a pressure at least 70% of the critical pressure but less than the critical pressure and to a temperature of at least 500° F. where the critical pressure is the pressure at which the latent heat of vaporization is substantially zero; moving the water and a quantity of the superheated steam from said source into a mixing zone and into admixing relationship with each other to increase the temperature of the water and cause a major portion of the water to be vaporized and converted to saturated steam while leaving only a residual amount of water containing salts and other solids without substantially condensing the superheated steam; separating the saturated steam from the residual water containing the salts and solids, said source being independent of the residual water separated from the saturated steam; and recirculating at least a part of the saturated steam from said mixing zone to said source of superheated steam.

2. A method as set forth in claim 1, wherein the pressure and temperature of said degasified water is at least 90% of the critical pressure and at least 550° F., respectively.

3. A method as set forth in claim 1, wherein said aerated water is geothermal brine.

4. Apparatus for converting aerated water containing dissolved salts and suspended solids to saturated steam comprising: means defining a source of superheated steam, said source having a fluid outlet; means defining a fluid mixing zone, said mixing zone defining means having an inlet nozzle, the outlet of the source being in fluid communication with the nozzle; means defining a path of flow for aerated water containing dissolved salts and suspended solids, said path being in fluid communication with said mixing zone; means across said path for preheating the water flowing along the path; means coupling the path defining means to be a source of said water; means coupled with the path defining means and said source of superheated steam for degasifying means the water flowing along the path by scrubbing the water with a portion of the superheated steam; means across said path for providing a back pressure in the water flowing toward said degasifying means; means coupled with said degasifying means for pumping the degasified water along the path and for heating the degasified water as it moves along said path, said degasified water being movable by pumping into the nozzle and into admixing relationship with superheated steam in said mixing zone to cause a major portion of the water to be evaporated and to be converted into saturated steam while a residual amount of water containing dissolved salts and suspended solids remains unevaporated, said pumping means and heating means being operable to pressurize and heat, respectively, the degasified water to a pressure at least 70% of the critical pressure but less than the critical pressure and to a temperature of at least 500° F. where the critical pressure is the pressure at which the latent heat of vaporization of the degasified water is substantially zero; means coupled with said mixing zone for separating the residual water containing dissolved salts and suspended solids from the saturated steam; and means coupled with said separating means for directing the saturated steam away from the zone, said directing means including means for recirculating at least a part of the saturated steam to said source of superheated steam.

5. Apparatus as set forth in claim 4, wherein said pressure and temperature of the degasified water is at least 90% of the critical pressure and at least 550° F., respectively.

6. Apparatus as set forth in claim 4, wherein said aerated water is geothermal brine.

* * * * *